United States Patent [19]

Tompkins et al.

[11] Patent Number: 5,128,084

[45] Date of Patent: * Jul. 7, 1992

[54] COEXTRUSION APPARATUS AND METHOD FOR VARYING THE INNER PROFILE OF A TUBULAR EXTRUDATE

[75] Inventors: Dale A. Tompkins, Akron; Richard W. Sicka, Brecksville, both of Ohio

[73] Assignee: Bridgestone/Firestone, Inc., Akron, Ohio

[*] Notice: The portion of the term of this patent subsequent to Nov. 5, 2008 has been disclaimed.

[21] Appl. No.: 558,061

[22] Filed: Jul. 24, 1990

[51] Int. Cl.⁵ .................. B29C 47/02; B29C 47/06; B29C 47/28

[52] U.S. Cl. .................. 264/167; 264/173; 264/174; 264/209.2; 264/209.8; 425/114; 425/132; 425/133.1; 425/380; 425/381; 425/462; 425/465; 425/466; 425/467

[58] Field of Search .................. 264/40.7, 167, 173, 264/174, 209.2, 209.8; 425/113, 114, 131.1, 132, 133.1, 145, 380, 381, 462, 465, 466, 467

[56] References Cited

U.S. PATENT DOCUMENTS

| | | |
|---|---|---|
| 2,501,690 | 3/1950 | Prendergast . |
| 2,736,921 | 3/1956 | Mulbarger . |
| 3,078,507 | 2/1963 | Park . |
| 3,209,404 | 10/1965 | Hagen . |
| 3,281,896 | 11/1966 | Meyer et al. . |
| 3,453,690 | 7/1969 | Mayner et al. . |
| 3,587,281 | 6/1971 | Lemelson ............... 72/265 |
| 3,944,641 | 3/1976 | Lemelson ............... 264/70 |
| 4,029,458 | 6/1977 | Kim et al. ............... 425/135 |
| 4,038,017 | 7/1977 | Langecker ............... 425/466 |
| 4,047,868 | 9/1977 | Kudo et al. ............... 425/133.1 |
| 4,149,839 | 4/1979 | Iwawaki et al. ............... 425/133.1 |
| 4,171,195 | 10/1979 | Klein et al. ............... 425/141 |
| 4,249,875 | 2/1981 | Hart et al. ............... 425/133.1 |
| 4,279,857 | 7/1981 | Feuerherm ............... 264/541 |
| 4,422,839 | 12/1983 | Przytulla et al. ............... 425/465 |
| 4,465,449 | 8/1984 | Hornbeck ............... 425/131.1 |
| 4,472,129 | 9/1984 | Siard ............... 425/381 |
| 4,507,071 | 3/1985 | Hahn et al. ............... 425/133.1 |
| 4,578,024 | 3/1986 | Sicka et al. ............... 425/114 |
| 4,578,025 | 3/1986 | Ando et al. ............... 425/133.1 |
| 4,657,718 | 4/1987 | Sicka et al. ............... 264/146 |
| 4,657,718 | 4/1987 | Sicka et al. ............... 264/146 |
| 4,776,909 | 10/1988 | Bohm et al. ............... 156/117 |
| 4,946,364 | 8/1990 | Wagner et al. ............... 425/72.1 |

FOREIGN PATENT DOCUMENTS

1370281  10/1974  United Kingdom ............... 425/132
2050933  1/1981  United Kingdom .

Primary Examiner—Leo B. Tentoni
Attorney, Agent, or Firm—Ernst H. Ruf

[57] ABSTRACT

Coextrusion apparatus for varying the inner profile of a generally tubular extrudate formed by a first stream of elastomeric material, by an axially movable inner die ring which varies the size of an orifice and consequently the flow of a second stream of elastomeric material which is deposited on the inner surface of the tubular extrudate. A compensating ring is axially slideably mounted within the inner die ring and moves generally in an opposite direction to the movement of the die ring to compensate for pressure changes within the second stream of material caused by varying the size of the orifice, to provide an accurately controlled initiation and termination of the material. Concentrically mounted pressure actuated piston rods control the movement of the inner die ring and compensation ring. The orifice for the second stream of elastomeric material is located slightly downstream of the orifice for the tubular extrudate and extends in a generally radial direction. A reinforcing guide directs a plurality of fiber-type reinforcing elements into the tubular extrudate prior to depositing the second stream of elastomeric material on the inner surface thereof. A method for varying the inner profile of the interior surface of a tubular extrudate is also presented.

22 Claims, 9 Drawing Sheets

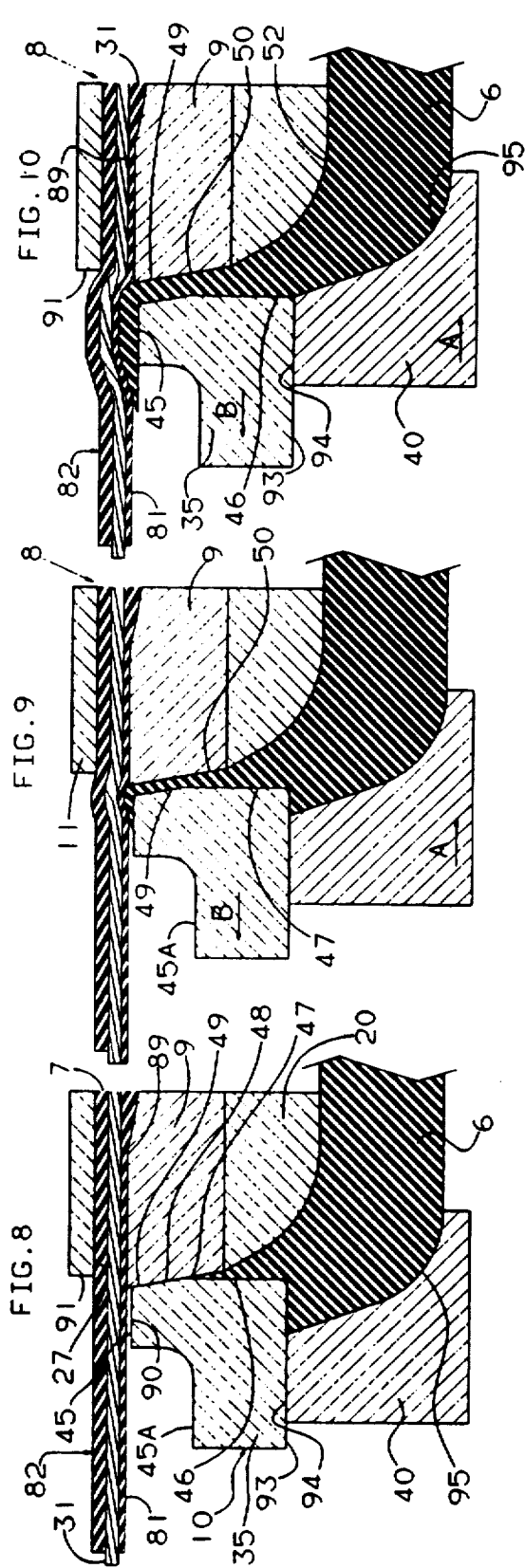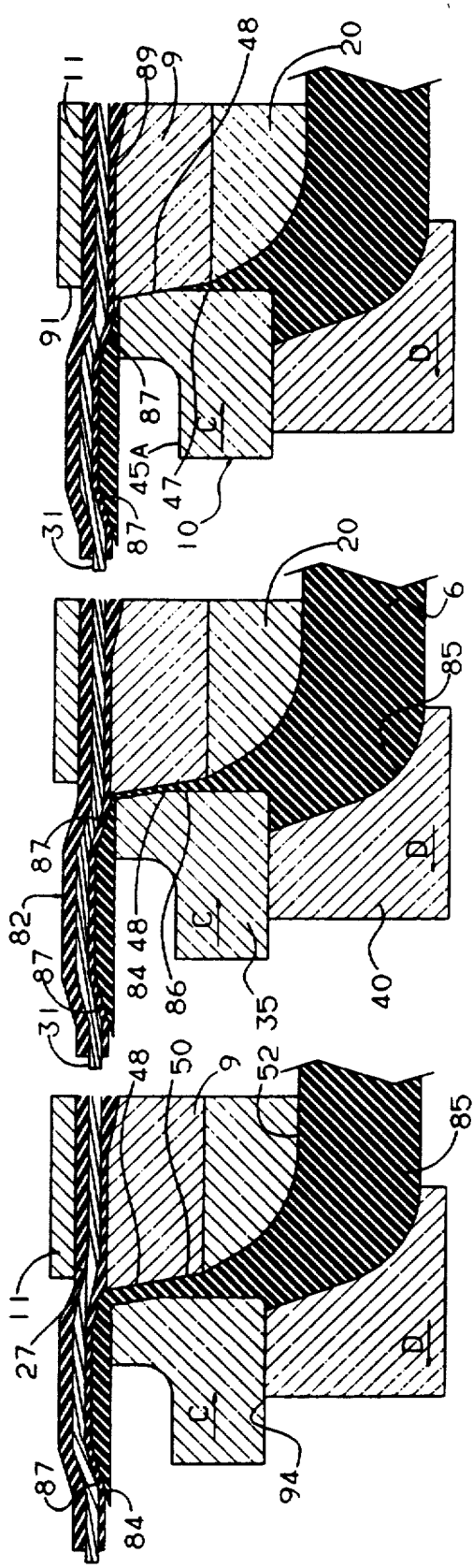

COEXTRUSION APPARATUS AND METHOD FOR VARYING THE INNER PROFILE OF A TUBULAR EXTRUDATE

TECHNICAL FIELD

The field of art to which this invention pertains is that of a coextrusion apparatus and method, particularly for use in manufacturing annular seamless components of elastomeric materials such as used in the production of pneumatic tires, specifically body plies for radial tires. More particularly the invention relates to such a coextrusion apparatus and method in which the inner profile of the tubular extrudate is varied by varying the amount of elastomeric material applied to the inner surface of the extrudate.

BACKGROUND ART

Tubular components or articles such as pneumatic tire body plies, have previously generally been built by utilizing woven fabric and calendering the same with rubber stock which, when cut to size, entails wrapping the sheet component around a tire building drum and overlapping the ends of the sheet to produce an annulus with a generally axially extending seam. In order to avoid this lapped or seamed construction, extrusion has been employed in the prior art whereby a tubular extrudate is produced containing reinforcement cords disposed therein.

Many of the problems with such lapped or seamed construction have been resolved by our previous invention of a coextrusion apparatus and method disclosed in U.S. Pat. Nos. 4,578,024 and 4,657,718, which are incorporated herein by reference in the interest of full disclosure. These earlier inventions provide a solution to the noted prior art problems by producing a generally tubular elastomeric ply or extrudate made up of first and second concentric tubular streams of elastomeric material having interposed adjacent their common interface, a closely and uniformly spaced array of parallel reinforcing elements. In the building of a tire, the carcass or first stage body consists of six elements namely, a body ply which is the reinforcing cord and skim, two sidewall bands or annuli, two body ply insert annuli and an inner liner. Heretofore assembly or placement of these six bands on a tire building drum required six separate manually performed steps wherein the individual strips were placed on the tire building drum.

These various individual strips of rubber usually were formed of different elastomeric compositions in order to achieve different results when assembled into the final tire. The inner liner is formed of a highly air impervious material and is applied to the body ply to provide the barrier for retaining the air within a tubeless pneumatic tire. The particular compound of the inner liner provides such impermeability characteristics. The present invention described below pertains particularly to the application of an inner liner on the tubular body ply component of a vehicle tire in forming a first stage tire wherein the body ply is extruded as a tubular extrudate and the inner liner applied at distinct locations on the inner surface of the tubular extrudate.

The most pertinent prior art with respect to applying an inner liner or layer of material on the inner surface of an outer layer or extrudate are shown in the following patents.

U.S Pat. No. 3,078,507 discloses an extruding device for making hollow cylinders and comprises an extrusion head having a central bore and an annular extrusion chamber. A control sleeve slides axially within a guide sleeve. This member can serve as a cutoff member or can be used to control the thickness of the extrudate flow. A control sleeve also is provided having an irregular beveled lower end so that thicker walls can be formed at opposite points of the extrusion.

U.S. Pat. No. 3,209,404 discloses a screw extruder having a barrel and a screw rotatable within the barrel. A die holder includes a die insert in a tubular mandrel. A rod is axially movable within a pin and a sleeve can be set to any desired position by controlling the pressure of the volume of fluid admitted to a cylinder in order to control the thickness of the wall of the tube being extruded. A valve actuating cam can be shaped to provide a desired cyclical fluid flow to the cylinder to obtain a predetermined variation in the wall thickness of the blank extruded from an orifice.

U.S. Pat. No. 3,281,896 discloses a parison extrusion die assembly having a movable mandrel, positioned within a cylindrical passageway in a die head. The longitudinal position of the mandrel can be adjusted so that the thickness of the tubular extrudate can be regulated by changes in the exit orifice.

U.S. Pat. No. 3,587,281 discloses an extrusion die having a mandrel head which is axially movable so as to vary the interior wall thickness of the tubular extrusion and completely stop the flow of extrusion material to terminate the extrusion. The extrusion apparatus includes a chamber, a die, and an axially movable mandrel with a tapering head defined by a lip. If the mandrel is driven in a predetermined direction, the extrusion material will not flow and the extrusion can be effectively cut to a predetermined length.

U.S. Pat. No. 3,944,641 discloses a device for altering the contour of the interior surface of a pipe wall. The apparatus comprises a rotatable blade or disc at the end of an extrusion mandrel. A lip formation is provided at the exterior surface of the mandrel outer end so as to form a plurality of grooves in the wall of the extrusion as the mandrel rotates. A linear actuator rotates the mandrel in the extrusion chamber.

U.S. Pat. No. 4,029,458 discloses an extrusion die having a linearly movable mandrel with a piston integrally formed along its intermediate portion which operates within a chamber. The thickness of the extrudate coming from a die is determined by the position of an annular edge of the mandrel with respect to the annular edge of a die head. When the control means alters the position of the piston the annular edge will be varied with respect to the annular edge of the die head to vary the shape of the parison being extruded.

U.S. Pat. No. 4,038,017 discloses an extrusion head, a die core, a sleeve and a movable annular piston. The piston is actuated by a hydraulic cylinder which raises and lowers a die core and adjusts the size of an annular opening which would alter the thickness of a laminate being produced by the extrusion head.

U.S. Pat. No. 4,047,868 discloses a parison extrusion molding machine comprising a special die head and a main extruder attached to the die head. The resin for the innermost layer of a composite is fed into an inlet from the main extruder. The thermoplastic resin flows through a passage which is defined by a sleeve wall and housing wall. The thickness of the laminate flow of the molten resin is controlled by adjusting the space between the inner sleeve of a pressure ring and the outer ring of a sleeve by moving an adjusting screw. Furthermore, the thickness of the parisons can be changed by varying the space between a core pin and die which results from vertical movement of a holder, together with the core pin.

U.S. Pat. No. 4,171,195 discloses a crosshead die in which the volume of the manifold can be varied so as to vary the relative wall thickness about the material flowing through the die. The apparatus includes a threaded collar, a forwardly extending sleeve and a frustroconical front portion which defines an orifice between the sleeve and rod. The wall thickness of material emerging from the orifice can be adjusted by axial movement of the rod and extension which changes the dimensions of the orifice.

U.S. Pat. No. 4,422,839 discloses an annular exit die for an extrusion head in which a die casing ring comprises generally concentric shells. The shells are nested within each other and are rigidly fastened to the housing of an extrusion head. A step portion is provided on one of the shells and the wall thickness of the extrudate can be varied at predetermined points as a result of the axial height adjustment of a die core. A lower edge of the die core forms the inner boundary of the die gap and displacement of the core downwardly in an axial fashion alters the wall thickness of the hollow extrudate.

U.S. Pat. No. 4,465,449 discloses an extrusion feed block apparatus which comprises an extrusion die and a cylindrical torpedo element disposed within a central bore. Radial movement of the torpedo element by a spider body alters the dimensions of a passageway and, thus, the thickness of the inner layer of a pipe. This movement is accomplished by threading bolts inwardly and outwardly. A bushing is also radially adjustable and will adjust the passageway. This device serves to control the thickness uniformity of an inner pipe layer and the overall uniformity of the laminate as it traverses the passageway.

U.S. Pat. No. 4,507,071 discloses an apparatus for forming a multiple layer laminated pipe. A die body is provided having a transitional body portion and a discharge end. The discharge sleeve is concentrically positioned within a sleeve adjustment body and includes an annular ridge engaged by an annular lip of a sleeve adjustment body. The sleeve is capable of slight radial movement. A plug can be used to reduce the flow of central passage, and additional adjustments in the thickness of the outer layer and inner layer can be performed by rotating adjusting bolts so as to radially reposition the sleeve to a desired location.

U.S. Pat. No. 4,578,025 discloses a die assembly for extruding multi-layer parisons which includes a plurality of control rings for determining the thickness of each layer. The apparatus includes a core pin, a mandrel, and a plurality of control rings. Selection of the curvature and height of the control rings can be selected to change the thickness of the resin material passing through gaps formed therebetween. The overall thickness the combined resin laminate can be controlled by moving the core pin and die with a shaft prior to the resin exiting from the nozzle.

Although certain of the prior art patents discussed above disclose an axially movable mandrel which is capable of either completely stopping or modulating the flow of material through an extrusion orifice, none of these patents disclose the specific configuration of applicant's apparatus and method steps as set forth below. In particular, the prior art does not disclose a relatively stationary cylindrical sleeve and a piston movable within the sleeve which has a rearwardly directed edge for modulating and/or cutting off the flow of extrudate, in combination with means for compensating for the pressure changes within the extrudate adjacent the orifice for applying the inner layer, to enable a precise cutoff and start of the inner lining as in our invention.

U.S. Pat. No. 4,776,909 which is assigned to the same assignee as the present application, discloses broadly a method for varying the thickness of an extrudate by varying the inner surface thereof by adjusting an extrusion die opening in a controlled manner so as to vary the feed rate of rubber to the extrusion orifice. However, no method steps or apparatus are shown or described in this earlier patent which compensates for the pressure existing within the extrudate upon the stopping and starting of the flow of the extrudate when forming the inner layer to provide an accurate termination and start of the inner layer as in our invention.

DISCLOSURE OF THE INVENTION

An objective of the invention is providing a solution to the noted prior art problem in terms of apparatus and method by producing a generally tubular elastomeric ply in which the inner surface or profile thereof can be varied, especially for use in a first stage tire.

A further objective is to provide a coextrusion apparatus and method in which the interior profile of the extrudate, composite or body can be applied substantially simultaneously with the formation of the tubular body; and in which the inner liner material or profile can be abruptly initiated, profiled and terminated with no smearing or contamination of the inner surface of the tubular extrudate on which the inner liner is applied, whereby the tubular composite can be cut at a desired location enabling the turnup or turndown or the ply around a tire bead and bead filler can be accomplished without harmful effects from contamination.

A further objective is to provide such a coextrusion apparatus and method in which a shear termination can be made for the flow stream of the inner liner elastomeric material which is applied to the inner surface of the tubular extrudate, together with volumetric compensation for the flow channel through which the inner liner material is moving, by hydraulic actuation in opposition to the movement of the termination mechanism.

Still another objective the invention is to provide such a coextrusion apparatus and method in which filament-type or cord reinforcing elements can be introduced into the tubular extrudate generally simultaneously with the formation of the tubular extrudate, and generally simultaneously with the applying of the profiled interior surface on the tubular extrudate.

A further objective of the invention is to provide such a coextrusion apparatus and method which will prepare a precise, accurate, multi component composite tubular member intended primarily for formation of a pneumatic tire, having a profiled interior surface whereby the interior surface can be profiled with different materials which can be abruptly initiated and terminated without drool, weeping or smearing of the inner material and without contamination of the thin-coated inner surface of the tubular extrudate.

A still further objective is to provide such an improved coextrusion apparatus and method in which the inner liner preferably has a ramped beginning and end configuration providing a smooth merger with the inner surface of the reinforced tubular extrudate; and in which this smooth merger is accomplished by use of a compensator ring which adjusts the volume of the flow channel adjacent the cutoff or shear termination point to reduce undesired volumetric variations and pressure variations within the inner material flow channel at the discharge orifice where it is applied to the inner surface of the tubular extrudate.

Still a further objective of the invention is to provide such an improved coextrusion apparatus in which the application of the inner or lumen coating material is controlled principally by a inner die member and a compensating ring which are coaxially slideable with respect to each other, each of which is movable by a hydraulically actuated piston rod, one of which is slideably located within the other piston rod, to provide a compact, yet highly efficient piece of equipment, whereby the movement of the actuating rods and corresponding die ring and compensating ring can be accurately controlled by programmable equipment or the like.

A further objective is to provide such an improved coextrusion apparatus which is of a relatively rugged and durable construction, which can be easily disassembled for repair and maintenance, and which can be used with commercially available extruders for receiving the supply of extrudate material; and in which the type of reinforcing elements incorporated therein can vary depending upon the particular final tire product desired.

These objectives and advantages are obtained by the apparatus of the invention, the general nature of which may be stated as a coextrusion apparatus for varying the inner profile of a generally tubular extrudate, including inner and outer die assemblies forming an annular extrusion orifice for forming the tubular extrudate; first means for forming an outer tubular flow channel for delivering a first stream of elastomeric material to the die assemblies to form the outer portion of the tubular extrudate; second means for forming an inner tubular flow channel for delivering a second stream of elastomeric material toward the die assemblies for depositing on the inner surface of the tubular extrudate; and third means for controlling the flow of the second stream of elastomeric material to change the amount of said elastomeric material deposited on the inner surface of the tubular extrudate to vary the profile of said inner surface.

These objectives and advantages are further obtained by the improved method of the invention, the general nature of which may be stated as a method for varying the inner profile of a generally tubular extrudate during the formation of said extrudate including the steps of, producing an outer independently controlled annular hollow stream of elastomeric material moving axially within a coextrusion head to form the generally tubular extrudate; producing an inner independently controlled stream of elastomeric material within said coextrusion head; applying said inner stream of elastomeric material in a generally radial direction onto the inner surface of the tubular extrudate in a controlled cyclical manner to vary the inner profile of said extrudate; and compensating for a change in pressure within the inner stream of elastomeric material caused by varying the flow volume of said inner stream of elastomeric material at a location generally adjacent the location of application of said inner stream on the inner surface of the tubular extrudate.

BRIEF DESCRIPTION OF THE DRAWINGS

A preferred embodiment of the invention, illustrative of the best mode in which applicants have contemplated applying the principles, is set forth in the following description and is shown in the drawings and is particularly and distinctly pointed out and set forth in the appended claims.

FIGS. 8-13 are enlarged fragmentary diagrammatic sectional views showing the operational sequence of forming the inner material profile on the interior wall of the tubular extrudate;

Similar numerals refer to similar parts throughout the drawings.

BEST MODE FOR CARRYING OUT THE INVENTION

Figure 1:
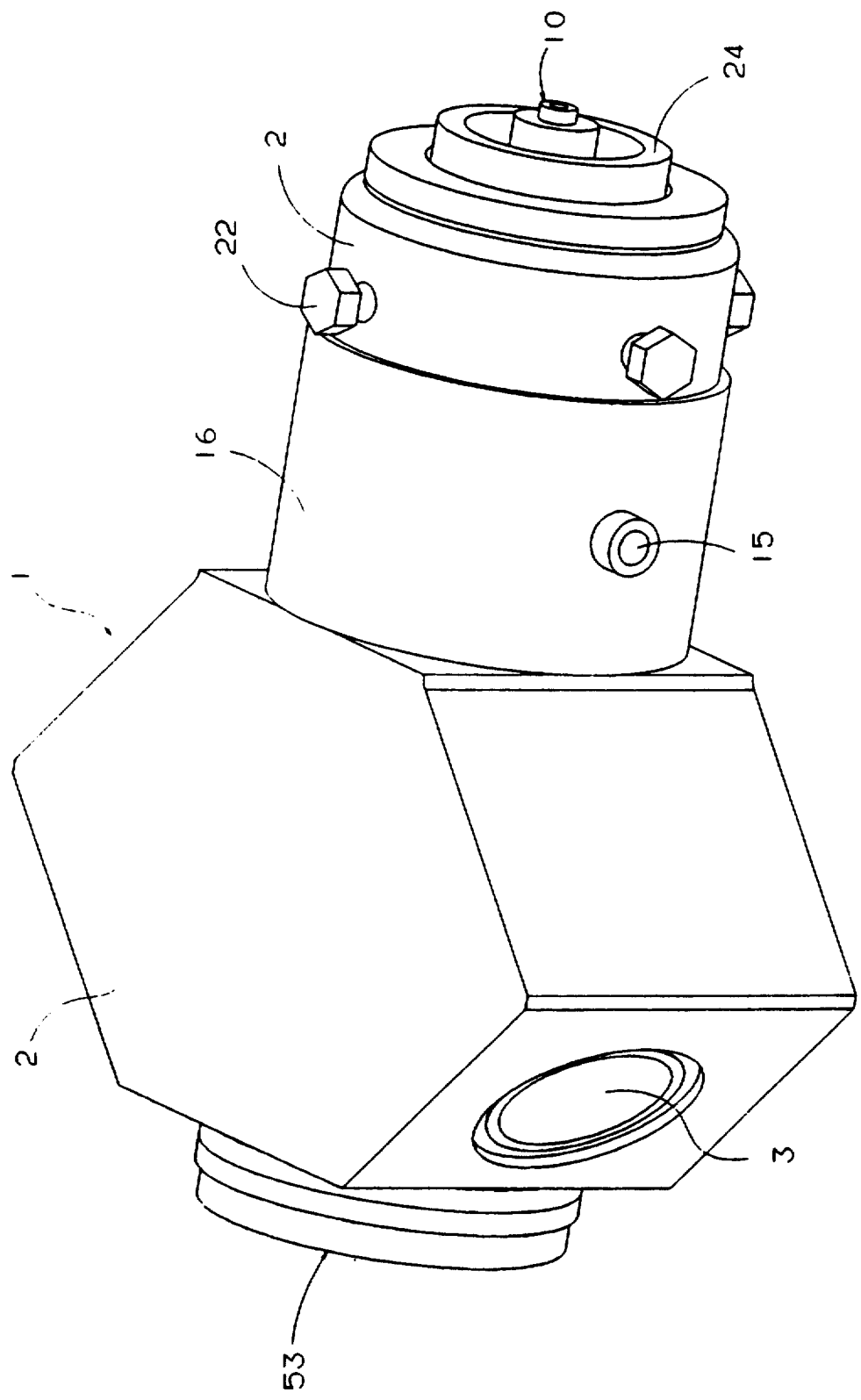
FIG. 1 is a perspective view of the coextrusion apparatus of the present invention.
Figure 2:
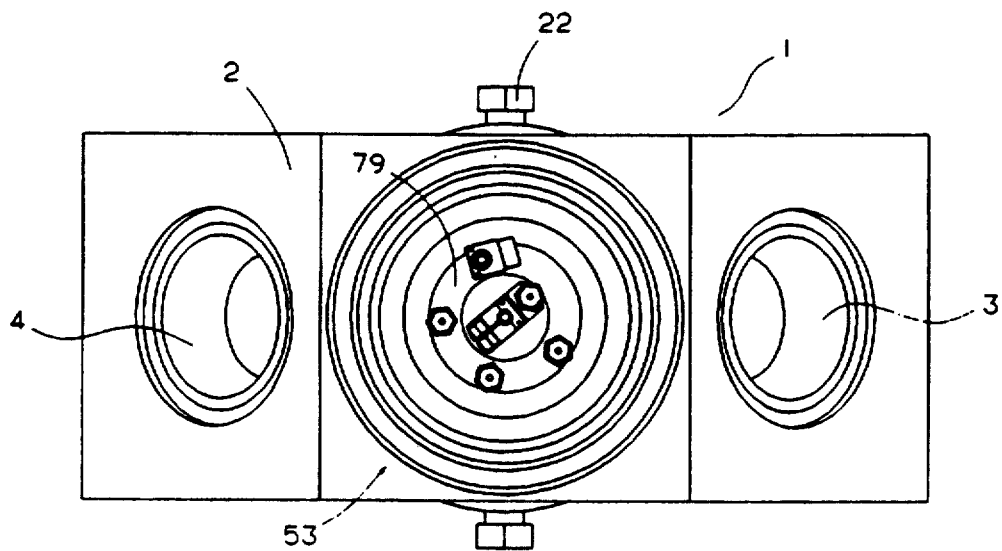
FIG. 2 is an enlarged elevational view of the entrance end of the coextrusion apparatus of FIG. 1.
Figure 3:
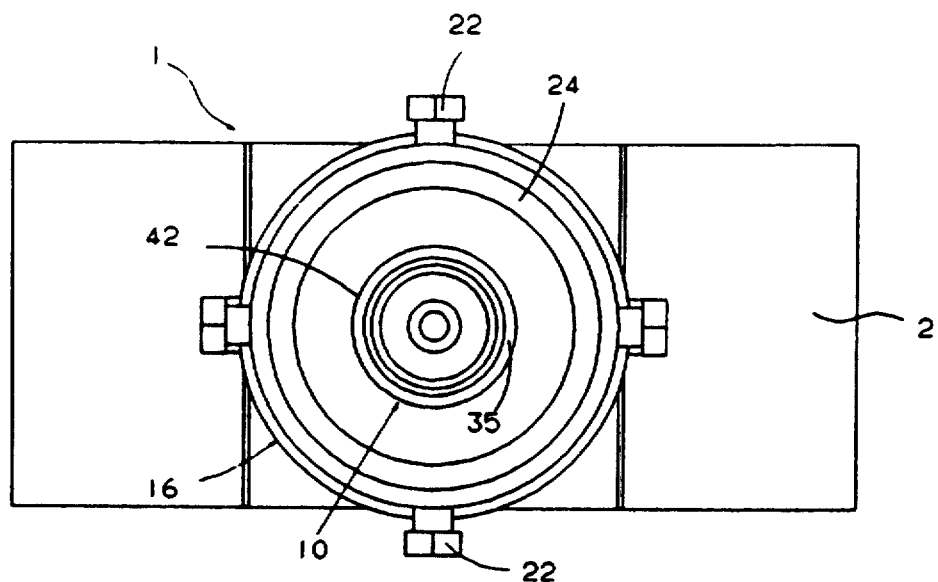
FIG. 3 is an enlarged elevational view of the exit end of the coextrusion apparatus of FIG. 1.
Figure 4:
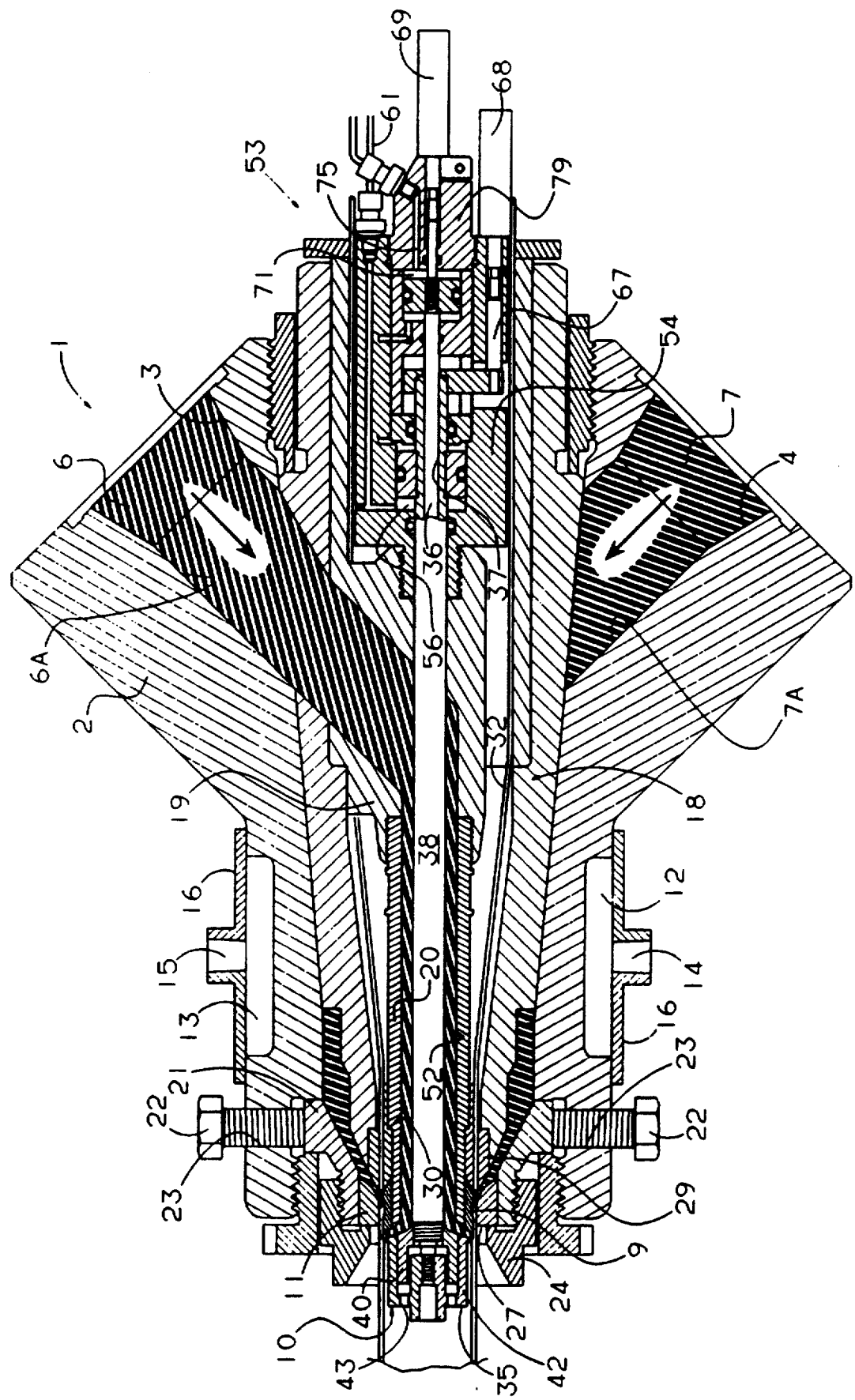
FIG. 4 is a vertical longitudinal sectional view of the extrusion apparatus of FIG. 1.

Referring now to the drawings and specifically to FIGS. 1, 2 and 3, there is illustrated a perspective and end views of a coextrusion head, indicated generally at 1. Coextrusion head 1 includes an outer shell or housing 2 formed with a pair of inlet feed apertures 3 and 4 (FIG. 4), which are adapted to be threadably connected to delivery conduits (not shown) through which separate streams 6 and 7 of elastomeric stock flow from one or more extruders. The elastomeric material flows into individual separate material flow channels 6A and 7A which are formed within the extrusion head for subsequent delivery to the extrusion orifices as described below. The apparatus and means of delivery of the separate streams of elastomeric material within the coextrusion head are similar in many respects to that shown in U.S. Pat. Nos. 4,578,024 and 4,657,718. Inlet aperture 3 communicates with inner flow channel 6A for inner flow stream 6 of an elastomeric material, while inlet aperture 4 communicates with flow channel 7A for outer flow stream 7 of an elastomeric material (FIG. 4).

Outer stream 7 flows through channel 7A which is formed within shell 2 in a manner similar to that shown in the two patents set forth above, for subsequent discharge through an annular outer orifice 27 (FIG. 5) formed between a generally fixed outer die ring 11 and an inner annular anvil ring 9 which form outer die assembly 8. Ring 9 also is a component of an inner die assembly, indicated generally at 10 (FIGS. 4, 5 and 8), described in greater detail hereinafter. Temperature fluid control channels 12 and 13 are formed in shell 2 in order to permit heating and cooling of the interior thereof and, in particular, to maintain the die assemblies at the desired operating temperatures. These channels are connected to a source of heating and cooling fluid by conduits which extend into threaded apertures 14 and 15 of channel cover plates 16 (FIG. 4). Also, flat heat exchangers are mounted top and bottom on the large horizontal surface of shell 2 (not shown).

An annular shaped member, indicated generally at 8, is mounted within outer shell 2 and forms in cooperation with outer shell 2 and with another cylindrical-shaped member 19, inner and outer flow channels 6A and 7A for fluid streams 6 and 7. A fixed extension tube 20 is threadably mounted on the forward end of innermost cylindrical member 19 and extends forwardly therefrom terminating adjacent the inner and outer die assemblies.

Outer die assembly 8 (FIG. 5) includes a known annular outer die holder 21 adjustable mounted by a plurality of centering bolts 22 which extend through threaded openings 23 formed in the forward end of outer shell 2. Outer die ring 11 is secured in a fixed position by die holder 21 and by an outer die retaining nut 24 which is threadably engaged with outer die ring holder 21.

Inner die assembly 10 (FIG. 5) includes a generally fixed annular-shaped anvil ring 9 which is a part of outer die assembly 8, spaced radially inwardly within outer die ring 11, which together with outer die ring 11 form annular outer extrusion orifice 27. Anvil ring 9 is telescopically mounted on the outer end of fixed extension tube 20 and is in abutment with a reinforcing-element-guide annular assembly 29 which is mounted against an annular shoulder 30 formed in the forward end of extension tube 20. Guide assembly 29 is similar to the guide assembly of previously noted U.S. Pat. Nos. 4,578,024 and 4,657,718 and is used for independently directing and accurately positioning a circular array of uniformly spaced individual reinforcing elements 31 which are located within and extend through individual guide tubes 32. Reinforcing elements 31 generally take the form of filaments, threads, yarns or cords and include natural or synthetic textiles, steel, wire fiberglass, etc. and are encapsulated within the outer stream 7 of elastomeric material and merge therewith at the outer extrusion orifice 27 as disclosed in the two noted patents.

General construction of coextrusion head 1 including shell 2, annular inner members 18 and 19, and the outer die assembly and reinforcing guide assembly, are well known in the art and form no particular part, per se, of the present invention, but are components within which the improvements of this invention are incorporated to form the improved coextrusion apparatus and for carrying out the improved method steps of the invention.

In accordance with this invention, inner die assembly 10 includes an inner die ring 35, shown particularly in FIGS. 4, 5 and 8-14. Ring 35 is connected to the extended end of an inner piston rod 36 which slideably extends within the hollow bore 37 of an outer piston rod 38. An annular pressure/volume compensating ring 40 is secured to the extended end of outer piston rod 38 and is slideably received and located within the inner cylindrical bore 41 formed by the cylindrical sidewall 42 of inner die ring 35 (FIG. 6). A plurality of air exhaust holes 43 are formed in the outer end wall 44, which is formed integrally with and forms the outer end of cylindrical wall 42 of inner die ring 35, to prevent the entrapment of air therein.

As shown in FIGS. 5 and 8-14, inner die ring 35 terminates in a pair of stepped outer annular surfaces 45 and 45A, and a generally radially extending end surface indicated generally at 46, which includes a radial section 47 and a slightly tapered conical section 48. End surface 46 of inner die ring 35 forms inner extrusion orifice 49 in cooperation with the generally slightly conically extending annular end surface 50 of anvil ring 9. Inner orifice 49 communicates with an annular inner flow channel 52 which is formed between the outer surface of outer piston rod 38 and the inner surface of extension tube 20 and communicates with inner flow channel 6A. Piston rods 36 and 38 extend through the interior or bore of tube 20 as shown particularly in FIGS. 4 and 5.

The inner ends of piston rods 36 and 38 communicate with a piston actuation assembly indicated generally at 53 (FIG. 7), which is mounted within the rear or entrance end of coextrusion shell 2 and is described in detail below. Actuation assembly 53 includes a hydraulic cylinder 54 which is threadably connected in an opening 51 formed in the rear wall of innermost annular member 19 (FIG. 4). Cylinder 54 is formed with a stepped inner bore indicated generally at 55, having a first chamber 56 in which is slideably mounted a piston 57 that is connected to outer piston rod 38. Piston 57 is a dual acting piston and has a center sealing O-ring 58 and a pair of fluid inlet and outlet ports 59 and 60 communicating with opposite sides of the piston. Fluid ports 59 and 60 extend through the body of hydraulic cylinder 54 and are connected to fluid lines 61. Another O-ring 62 is sealingly engaged with the sliding outer surface of outer piston rod 38 forwardly of piston 57. Outer piston rod 38 extends through a divider wall 64 and is in sliding sealing engagement therewith by another O-ring 65. The innermost end of outer piston rod 38 is connected to an encoder attachment 66. Encoder attachment 66 is connected with a shaft 67 to a linear encoder 68 which provides the feedback for the operational control of the improved coextrusion apparatus.

Figure 7:
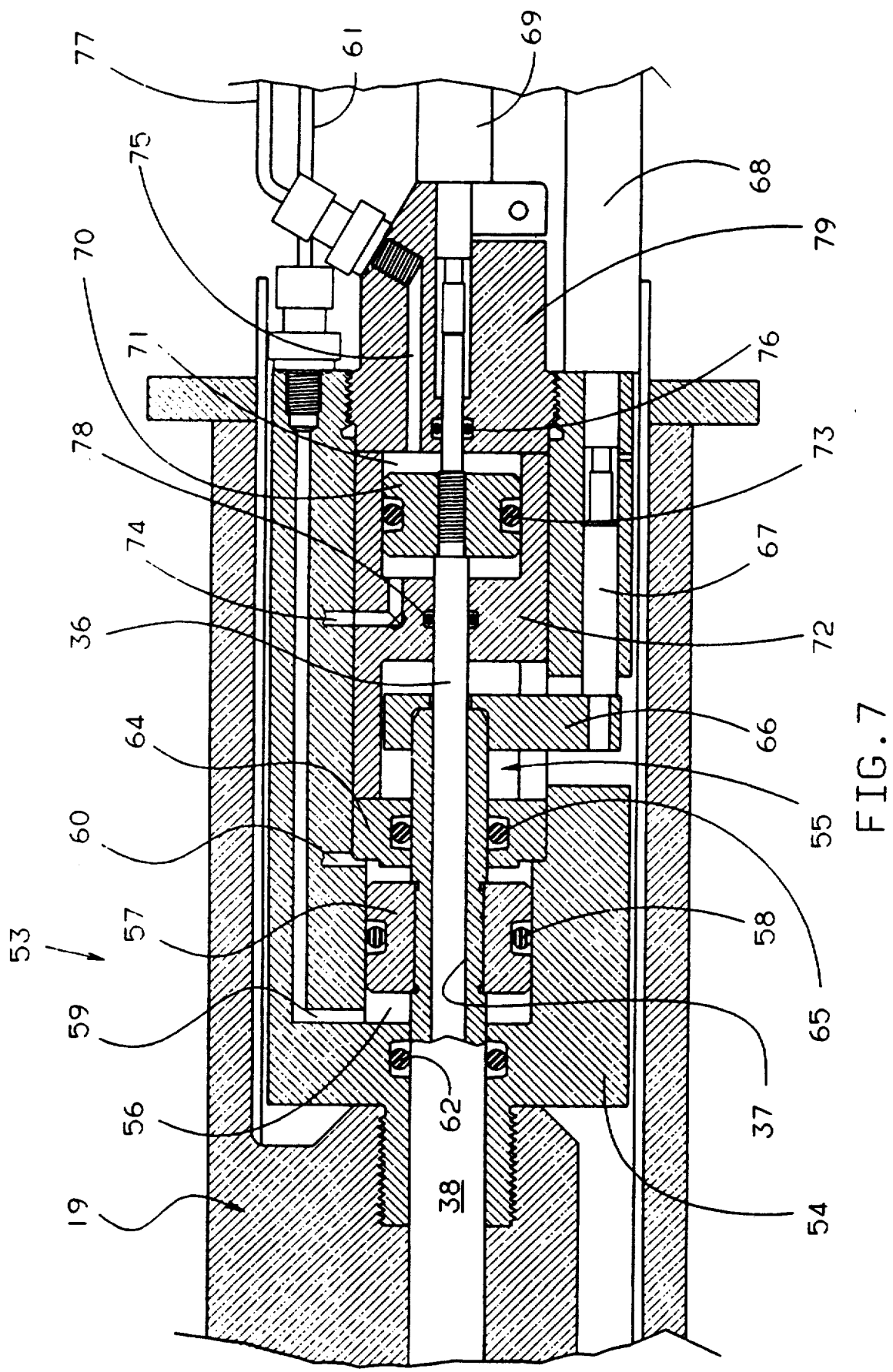
FIG. 7 is an enlarged sectional view of the actuation end of the coextrusion apparatus as shown in FIG. 4.
Figure 14:
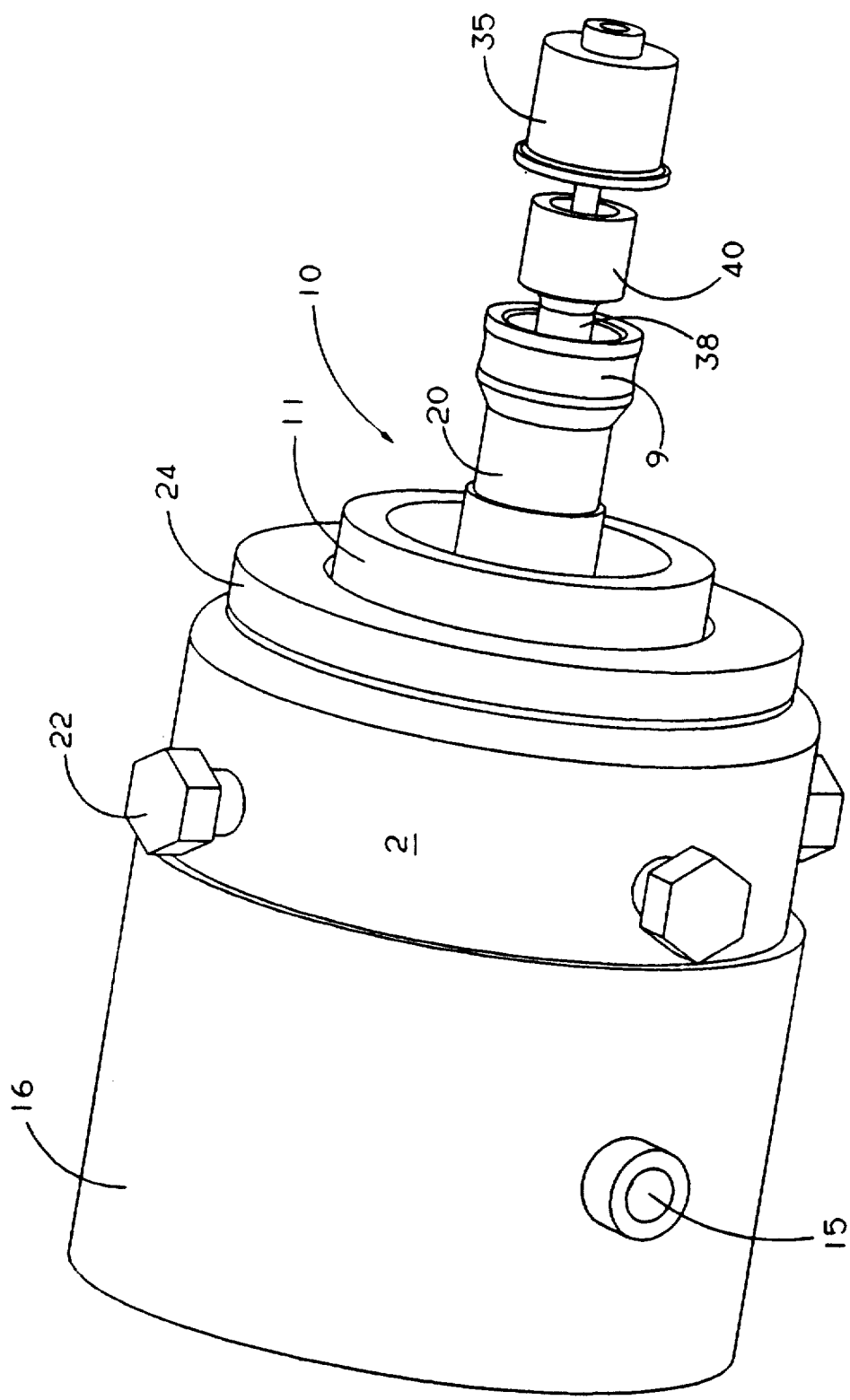
FIG. 14 is a partially exploded perspective view of the inner die ring and compensator ring of the extrusion apparatus.

Inner piston rods 36 is connected to a piston 70 which is slideably mounted within a second chamber 71 formed within the main hydraulic cylinder bore by a partition wall 72 and is slideably sealingly mounted therein by an O-ring 73. A pair of fluid inlet and outlet ports 74 and 75 communicate with chamber 71 on opposite sides of piston 70 to provide the dual action for the piston similar to that of piston 57 described above. Fluid lines 77 communicate with the fluid ports as shown in FIG. 7. Inner piston rod 36 is in sealing relationship with partition wall 72 by another O-ring 78 and with an end closure housing 79 of the hydraulic cylinder by an O-ring 76. Piston rod 36 is connected to another linear encoder 69 which provides the feedback for the operational control in a similar manner as encoder 68 of piston rod 38.

The operation of the improved coextrusion apparatus and method steps of the invention are best illustrated by reference to FIGS. 4, 5 and 8-13. Inner and outer streams of rubber composition 6 and 7, respectively, are fed into coextrusion head 1 from extrusion apparatus well known in the art, and move through their respective flow channels 6A and 7A toward their respective extrusion orifices 27 and 49, respectively. Outer elastomeric stream 7 flows through outer extrusion orifice 27, as shown in FIG. 8, preferably containing reinforcing elements 31 embedded therein.

Figure 15:
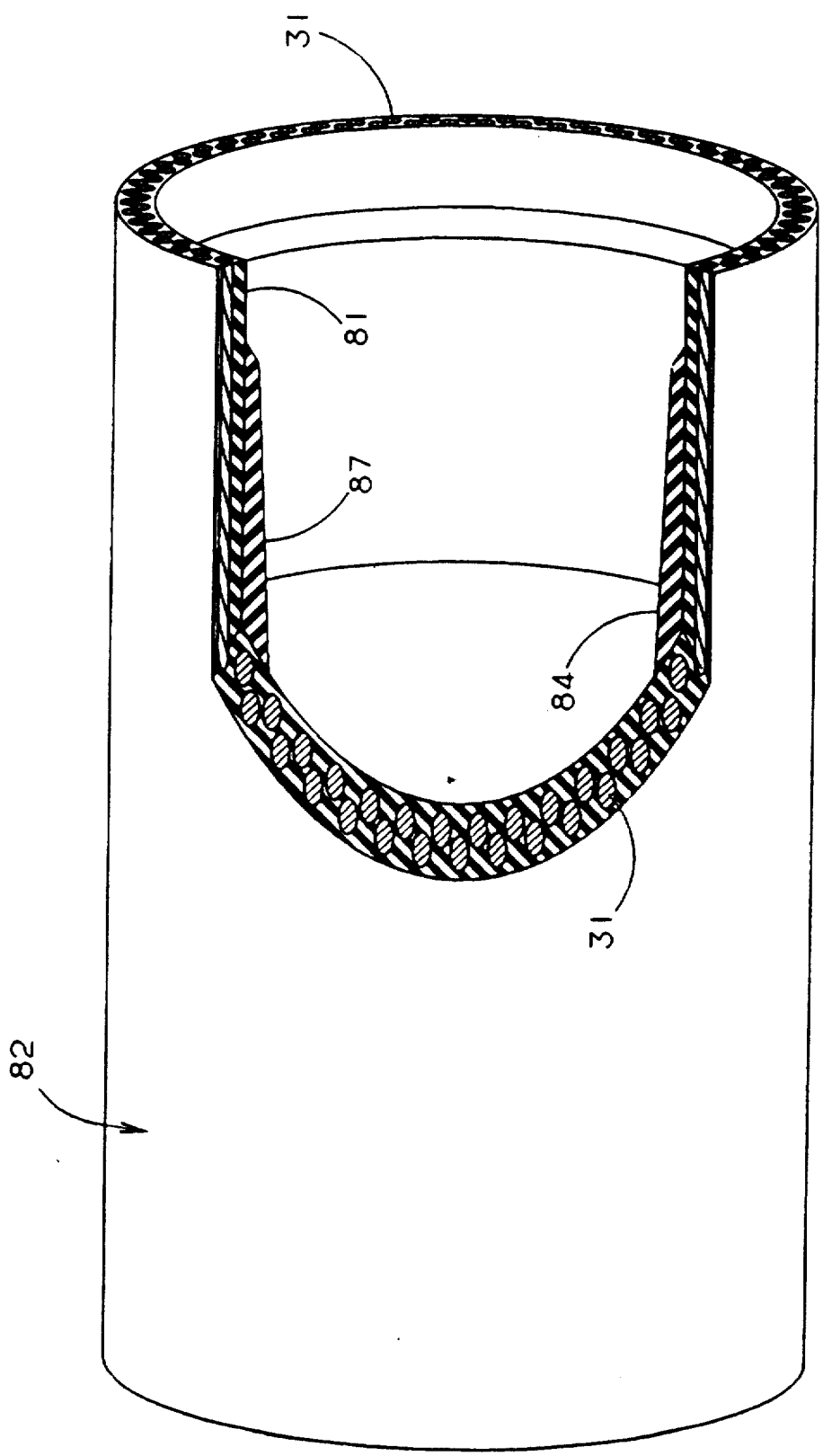
FIG. 15 is an enlarged perspective view of a tubular extrudate with parts broken away, showing the varied inner profile accomplished by the apparatus and method of the invention.

Inner die ring 35 is shown in FIG. 8 in closed position completely closing inner orifice 49 by the abutting engagement of tapered wall section 48 of die ring 35 against the annular, preferably conical end surface 50 of anvil ring 9. In order to apply an inner layer of an elastomeric material on inner surface 81 of the tubular extrudate (indicated generally at 82, FIGS. 8 and 15), which is formed by outer extrusion orifice 27, a programmed control mechanism of a type well known in the art, is actuated and supplies hydraulic fluid into piston chamber 71 which will move inner piston 70 forwardly to enlarge orifice 49. Piston 70 will move inner piston rod 36 and attached die ring 35 axially in the forward, or left-hand direction as viewing FIG. 5 and FIGS. 8-10. This axial movement will separate die ring surface 46 from anvil ring surface 50 and will open inner extrusion orifice 49 as shown in FIG. 9. This permits a flow of elastomeric material from inner stream 6 to move through orifice 49 and onto inner surface 81 of tubular extrudate 82.

In accordance with one of the features of the invention, compensating ring 40 will move axially inwardly in the direction of arrow A (FIGS. 9 and 10) generally simultaneously with the axial outward movement of inner die ring 35 in the direction of arrow B. The movement of compensating ring 40 is in a predetermined relationship with the outward movement of die ring 35 to reduce the volumetric area at the entrance to extrusion orifice 49 to maintain or achieve the required or desired pressure within the elastomeric material of inner stream 6 adjacent inner extrusion orifice 49. This action of the compensator 40 within the elastomeric stream provides for a smooth, even discharge flow rate of elastomeric material through inner orifice 49 and onto inner surface 81 of tubular extrudate 82.

Upon achieving the desired axial length of inner extrudate layer 84 on inner surface 81, the appropriate controls are actuated whereby inner piston rod 36 moves rearwardly to move inner die ring 35 in the direction of arrow C (FIGS. 11-13) to close orifice 49 simultaneously with the forward movement of inner piston rod 36 to move compensating ring 40 outwardly in the direction of arrow D. This coordinated movement provides for the formation of an expansion chamber area indicated at 85, adjacent orifice 49, whereby the pressure is reduced within the elastomeric material adjacent compensating ring 40 and is prevented from excessively forcing the remaining amount of elastomeric material indicated at 86 (FIG. 12) from squirting out through the closing of inner orifice 49, resulting in an uneven termination point of inner layer 84 thereby producing a smooth, complete, absolute termination point of the inner layer 84. Without such action this would not be possible.

The compensation of the pressure/volume at the time of initiation of the opening of inner orifice 49 and the subsequent flow of elastomeric material therethrough continuing through the termination of the inner flow upon closing of inner die ring 35, ensures a clean, smooth initiation and cutoff of the inner layer flow material providing a pair of ramped end surfaces 87 at the beginning and end of inner layer 84. Without the formation of the expansion chamber and the simultaneous compensation for the changes in pressure/volume which would occur within the elastomeric material adjacent the inner extrusion orifice, due to the opening and closing thereof, the termination and beginning of inner layer 84 would be uneven and undesirable. During the termination of the inner elastomeric stream upon closing of inner orifice 49, as shown in FIGS. 12 and 13, the terminating portion of the strip of material is placed in shear which provides for the smooth, ramped termination at the axial end of layer 84.

In accordance with additional features of the invention, the diameter of outer annular surface 45 of inner die ring 35 is less than the diameter of outer annular axially extending surface 89 of anvil ring 9 so that a space is provided indicated at 90 (FIG. 8), between inner surface 81 of extrudate 82 and surface 45 of inner die ring 35 to prevent the different elastomeric material of stream 7 from contacting surface 45 to prevent contamination thereof.

In accordance with another feature of inner die ring 35 and its relationship with anvil ring 9 and outer die ring 11, radial end face 91 of outer die ring 11 terminates upstream from the outer radial face or end surface 50 of anvil ring 9 (FIGS. 8-13) a distance at least equal to the maximum width of inner extrusion orifice 49. This space relationship enables the flow of elastomeric material moving through orifice 49 to move in a generally radially outward direction for adhering to inner surface 81 of extrudate 82.

In most applications, inner elastomeric stream 6 will be of a different rubber composition than that of outer elastomeric stream 7. In one particular type of tire manufacturing operation, such as forming the tire inner liner, elastomeric stream 6 will be of a rubber composition having a higher imperviousness to air than that of the composition of outer elastomeric stream 7 to provide the air barrier for the pneumatic tire to prevent passage of the compressed air through the tire body. However, the rubber compositions of inner and outer elastomeric streams 6 and 7 can be varied to achieve various results desired in the making of pneumatic tires or other tubular products.

Figure 5:
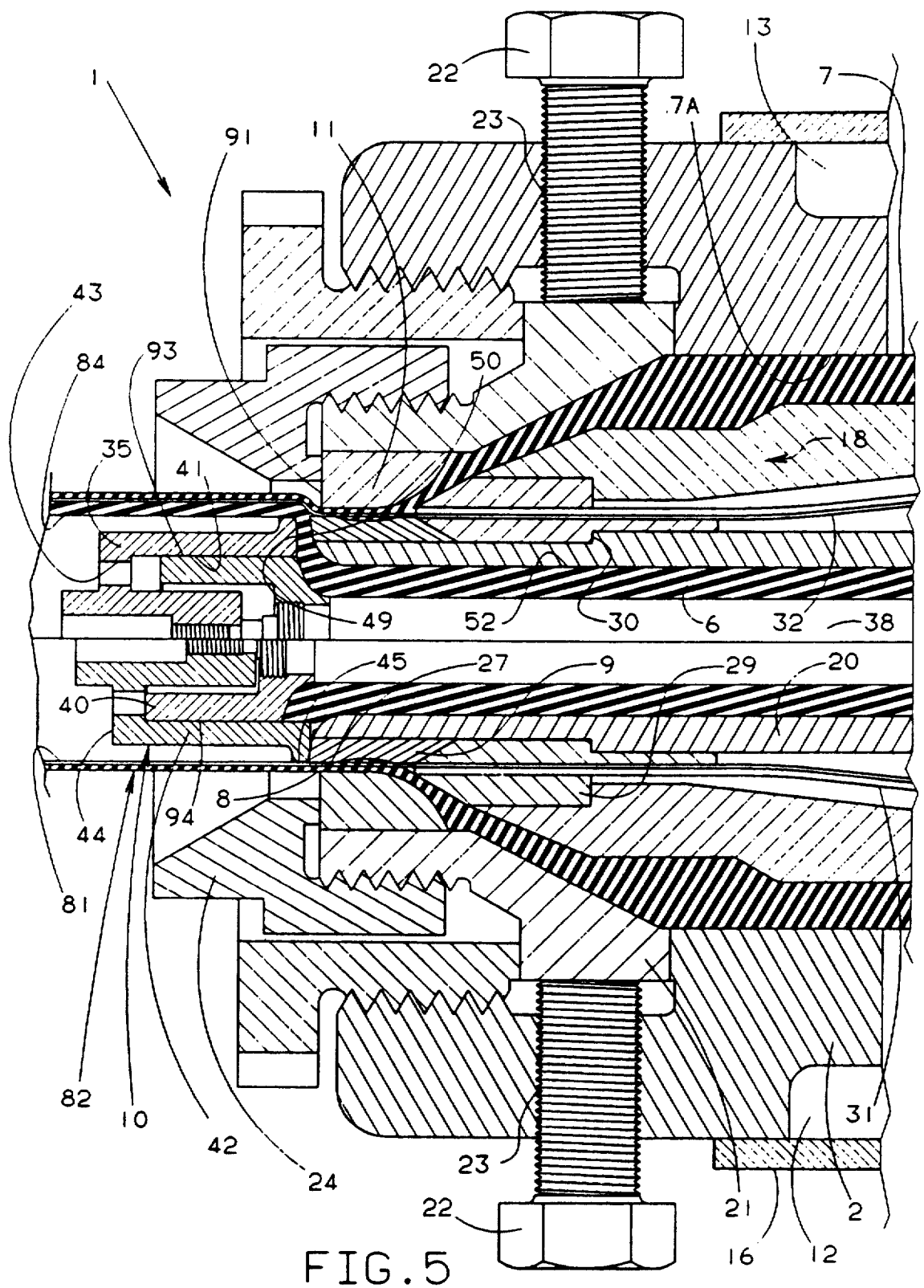
FIG. 5 is an enlarged fragmentary sectional view of the discharge end of the apparatus as shown in FIG. 4, with the die ring and compensator ring shown in split open and closed positions, respectively.
Figure 6:
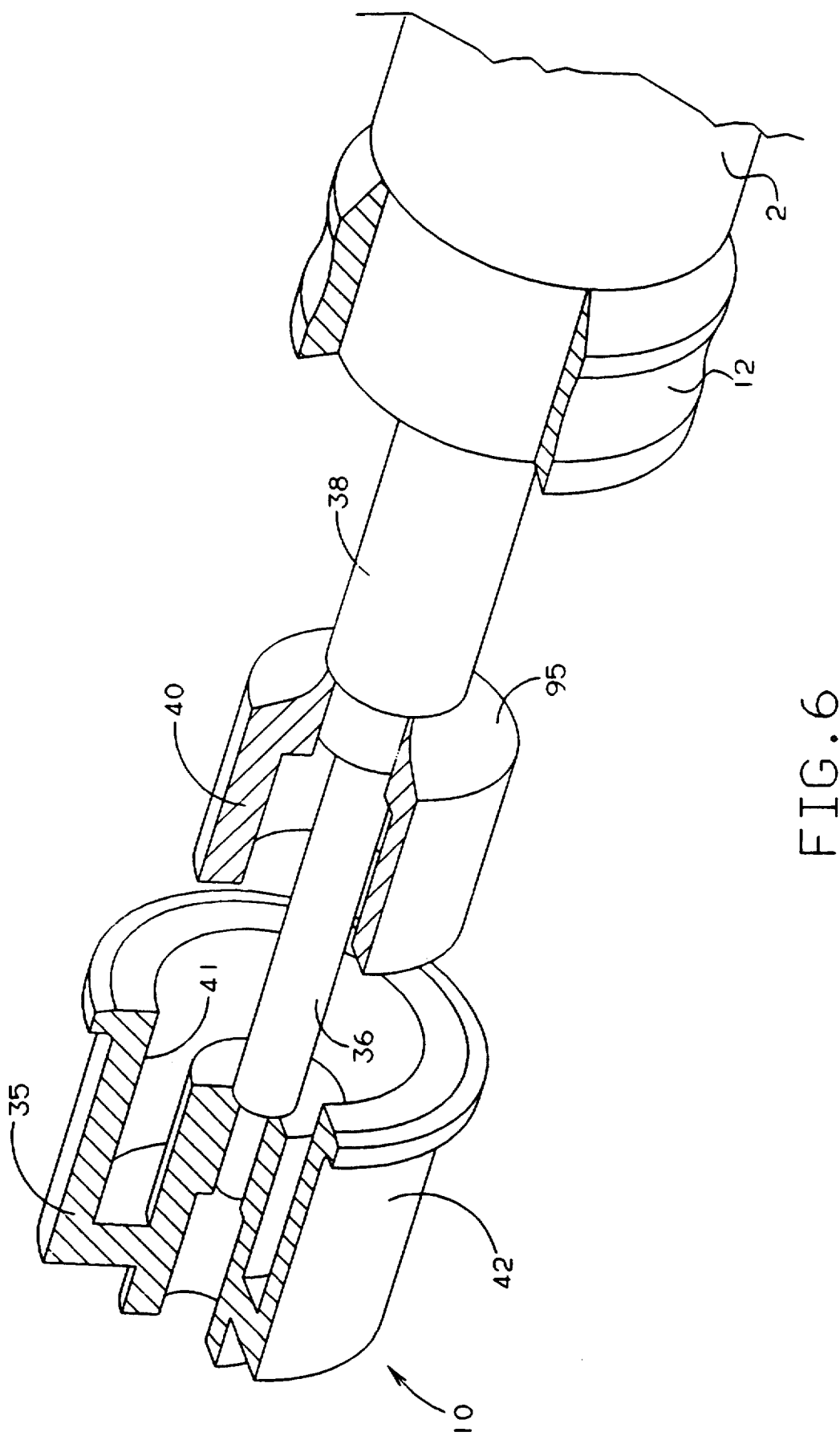
FIG. 6 is an exploded perspective view with portions broken away of the inner die ring and compensator ring.

Preferably, inner cylindrical surface 93 of inner die ring cylindrical wall 42 will be in sliding engagement with the outer cylindrical surface 94 of compensating ring 40, as shown particularly in FIGS. 5 and 8, to provide a sliding relationship therebetween to prevent the passage therethrough of elastomeric material. Furthermore, the inner annular end face 95 of compensating ring 40 is concavely formed to assist in forming expansion chamber 85 upon its coordinated axial movement with inner die ring 35.

Encoders 69 and 68 which are connected to piston rods 36 and 38, respectively, and the fluid supply lines associated therewith for controlling the pistons, are operatively connected by appropriate control circuitry to a programmable computer well known in the art. Such controlled movement enables the accurate control of the inner die ring and compensating ring for achieving the correct initiation and termination of inner elastomeric layer 84 in coordinated movement with the production of the outer tubular extrudate 82.

Furthermore, computer control preferably is utilized to control the flow rate and pressure of streams 6 and 7 of elastomeric material as it leaves the external extruders and enters coextrusion head 1, and the tension of incoming reinforcing elements 31. The relationship between the flow rate or pressure of incoming streams 6 and 7 determines the thickness of the applied inner extrudate layer.

Likewise, upon opening and closing of inner extrusion orifice 49, the flow rate or pressure of elastomeric stream 6 will be correspondingly increased by the control computer as the die opens and decreased as the die closes to provide a uniform flow and pressure of elastomeric material through orifice 49. Also the thickness of inner extrudate layer 84 is determined in part by the flow rate or pressure imparted on incoming stream 6 by such computer control of the associated extruder.

These various parameters will be interconnected and controlled by an appropriate computer, microprocessor or the like, the features of which will vary depending upon the particular product being extruded.

Accordingly, the improved apparatus and method of the invention, provides for the accurately controlled application of an inner layer of an elastomeric material onto the inner surface of a continuously produced tubular extrudate to provide a smooth, preferably ramped initiation and cutoff of the inner layer with the extrudate, by compensating for the pressure changes at the inner extrusion orifice by an axially moveable compensating ring which moves in coordinated movement with a variable axially moveable inner die ring, which also enables the thickness of the inner layer to be regulated easily by adjusting the size of the inner extrusion orifice.

Accordingly, the improved coextrusion apparatus and method is simplified, provides an effective, safe, inexpensive, and efficient device and operation which achieves all the enumerated objectives, provides for eliminating difficulties encountered with prior devices and methods, and solves problems and obtains new results in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved coextrusion apparatus is constructed and the improved coextrusion method is used, the characteristics of the construction and method, and the advantageous, new and useful results obtained; the new and useful structures, devices, elements, arrangements, parts, combinations and method steps, are set forth in the appended claims.

What is claimed is:

1. Coextrusion apparatus for varying the inner profile of a generally tubular extrudate, including an outer die assembly forming an outer annular extrusion orifice for forming the tubular extrudate having a central axis, and an inner die assembly having an axially moveable die ring forming an adjustable inner extrusion orifice; first means for forming an outer tubular flow channel for delivering a first stream of elastomeric material to the outer extrusion orifice of the outer die assembly to form the tubular extrudate; second means for forming an inner tubular flow channel for delivering a second stream of an elastomeric material to the inner extrusion orifice of the inner die assembly for selectively depositing a layer of said elastomeric material on an inner surface of the tubular extrudate; and third means for controlling the flow of the second stream of elastomeric material through the inner orifice to change the amount of said elastomeric material deposited on the inner surface of the tubular extrudate to vary the profile of said inner surface, said third means having a compensating ring moveable only in an axial direction opposite with respect to the axial movement of the inner die ring for controlling the pressure within the second stream of elastomeric material moving through said inner extrusion orifice and being deposited on the inner surface of the tubular extrudate.

2. The coextrusion apparatus of claim 1 in which the outer die assembly includes an outer die ring and an inner annular anvil ring which form the outer extrusion orifice; in which said anvil ring also forms the inner extrusion orifice with the axially moveable inner die ring; in which the third means further includes a first fluid pressure actuated device attached to the inner die ring for axially moving said inner die ring for adjusting the size of an inner extrusion orifice formed between said inner die ring and the anvil ring.

3. The coextrusion apparatus of claim 2 in which a second fluid pressure actuated device is connected to the compensating ring for axially moving said compensating ring in a direction opposite to the direction of movement of the inner die ring.

4. The coextrusion apparatus of claim 3 in which the first and second fluid pressure actuated devices are first and second piston rods, respectively; and in which each of the piston rods is controlled by a source of fluid pressure.

5. The coextrusion apparatus of claim 4 in which the first piston rod is movably mounted within a hollow interior of the second piston rod.

6. The coextrusion apparatus of claim 5 in which an axially extending hollow tubular member is mounted in a coaxial relationship about the first and second piston rods; and in which the inner flow channel is formed between the interior of said tubular member and the exterior of the second piston rod.

7. The coextrusion apparatus of claim 5 in which the inner die ring and compensator ring are attached to outer ends of the first and second piston rods, respectively; and in which pistons are attached to inner ends of said piston rods and are slideably mounted within separate fluid chambers of a hydraulic cylinder.

8. The coextrusion apparatus of claim 1 in which a reinforcing guide element is in communication with the outer flow channel for directing a plurality of individual reinforcing elements into the outer tubular flow channel for introduction into the first stream of elastomeric material.

9. The coextrusion apparatus of claim 2 in which the inner extrusion orifice is located downstream of the outer extrusion orifice.

10. The coextrusion apparatus of claim 2 in which the inner die ring is located in an axial downstream direction from the anvil ring; in which the inner die ring and anvil ring have outer annular surfaces; and in which the outer annular surface of the inner die ring has a smaller diameter than that of the outer annular surface of the anvil ring to prevent contact of said inner die ring outer annular surface with the first stream of elastomeric material and possible contamination thereof.

11. The coextrusion apparatus of claim 10 in which the outer die ring is spaced axially upstream from the inner extrusion orifice at distance at least generally equal to the thickness of the second stream of material passing through said inner extrusion orifice enabling said material to move generally radially outwardly through said inner orifice.

12. The coextrusion apparatus of claim 2 in which the outer extrusion orifice is generally fixed during the formation of the tubular extrudate; and in which the inner extrusion orifice is movable between open and closed positions to apply a distinct layer of elastomeric material on the inner surface of the tubular extrudate formed by the outer extrusion orifice.

13. The coextrusion apparatus defined in claim 2 in which the inner die ring is located concentrically about the compensating ring and has an inner cylindrical surface slideably engaged with a cylindrical outer surface of the compensating ring; and in which the compensating ring terminates in an annular inner end face which forms an expansion chamber in communication with the inner tubular flow channel.

14. The coextrusion apparatus of claim 2 in which the inner die ring and anvil ring have axially spaced annular end surfaces which define the inner extrusion orifice; and in which said annular end surfaces extend generally radially with respect to the axis of the tubular extrudate so that the stream of elastomeric material moves in a generally radial direction through said inner orifice when being deposited on the inner surface of the tubular extrudate.

15. The coextrusion apparatus of claim 14 in which the annular end surface of the inner die ring moves axially into abutment with the annular end surface of the anvil ring to block the flow of the second stream of elastomeric material.

16. The coextrusion apparatus of claim 1 in which the compensating ring moves in an axial direction opposite to that of the inner die ring to compensate for the pressure within the second stream of elastomeric material caused by varying the size of the orifice upon movement of said inner die ring.

17. A method for varying the inner profile of a generally tubular extrudate during the formation of said extrudate, including the steps of:
a) producing an outer independently controlled continuous annular hollow stream of elastomeric material moving axially within a coextrusion head to form the generally tubular extrudate;
b) providing an axially moveable die ring;
c) producing an inner independently controlled stream of elastomeric material within said coextrusion head by passing the stream through the axially moveable die ring;
d) applying said inner stream of elastomeric material in a generally radial direction onto an inner surface of the tubular extrudate in a controlled variable manner by axial movement of the inner die ring to vary the inner profile of said extrudate;
e) providing an axially moveable compensating ring; and
f) compensating for a change in pressure within the inner stream of elastomeric material caused by varying the flow volume of said inner stream of elastomeric material at a location generally adjacent the location of application of said inner stream on the inner surface of the tubular extrudate by axial movement only of the compensating ring in an opposite direction to the axial movement of the die ring.

18. The method defined in claim 17 including introducing a plurality of filament-type reinforcing elements into the outer stream of elastomeric material prior to applying the inner stream of ealstomeric material onto the inner surface of the tubular extrudate.

19. The method defined in claim 17 including passing the outer stream of elastomeric material through a fixed annular orifice to form the tubular extrudate; and passing the inner stream of elastomeric material through a variable annular orifice downstream of the fixed annular orifice when applying said inner stream onto the inner surface of the extrudate.

20. The method defined in claim 19 including located the variable annular orifice of the inner stream of elastomeric material downstream of the fixed annular orifice a distance at least equal to the maximum thickness of the inner stream of elastomeric material being applied to the inner surface of the extrudate.

21. The method defined in claim 19 including providing a material expansion chamber adjacent the variable extrusion orifice and varying the size of said expansion chamber in a generally inverse relationship to the size to which the variable orifice is varied to compensate for the change of pressure within the inner stream of elastomeric material.

22. The method defined in claim 17 including intermittently applying the inner stream of elastomeric material onto the inner surface of the tubular extrudate.

* * * * *